3,134,574
PINCH BAR
Aldor S. E. Reuterfors, Rockford, Ill., assignor to Estwing Manufacturing Company, Incorporated, Rockford, Ill., a corporation of Illinois
Filed Jan. 29, 1962, Ser. No. 169,376
1 Claim. (Cl. 254—25)

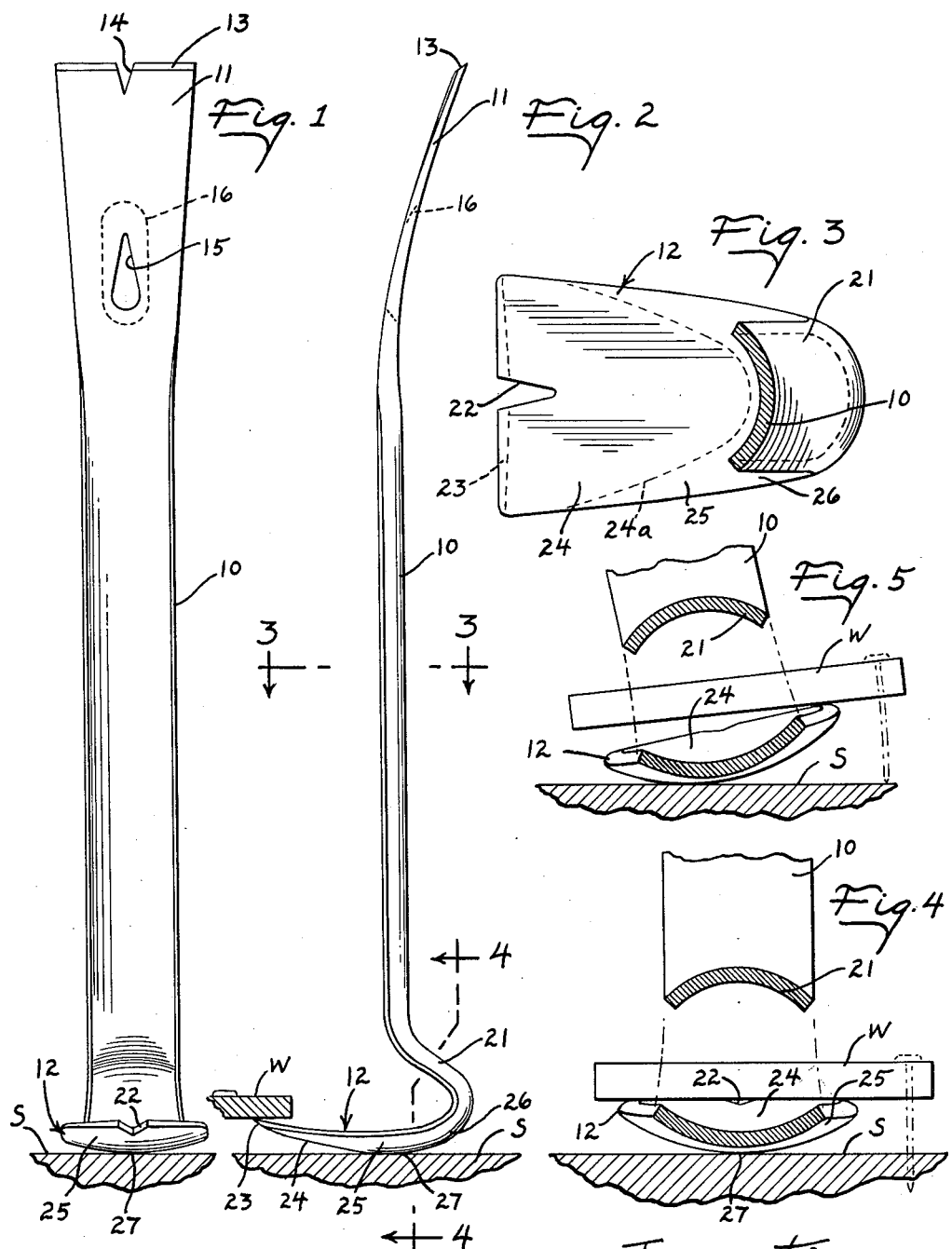

An important object of this invention is to provide a pinch bar having a transversely extending blade which is so arranged as to enable rocking of the blade on a support surface in a direction lengthwise of the blade and also crosswise thereof for loosening objects with a minimum of damage to the surface engaged by the blade.

Another object of this invention is to provide a pinch bar which is light in weight, strong in use, and economical to fabricate.

These, together with other objects and advantages of this invention will be appreciated as the invention becomes better understood by reference to the following detailed description when taken in connection with the accompanying drawings wherein:

FIGURE 1 is a front elevational view of the pinch bar;

FIG. 2 is a side elevational view of the bar;

FIG. 3 is a sectional view taken on the plane 3—3 of FIG. 2;

FIGS. 4 and 5 are fragmentary sectional views taken on the plane 4—4 of FIG. 2, and illustrating the pinch bar in different positions.

The pinch bar in general includes an elongated handle or lever 10 having a generally flat longitudinally extending blade 11 at one end and a transversely extending blade 12 at the other end. The pinch bar is advantageously fabricated from light weight strip stock and the handle is preferably formed with a transversely arched or channeled configuration to rigidify the same and to provide a comfortable hand grip. The generally flat blade 11 merges with the arched handle and is longitudinally curved as shown in FIG. 2 toward the convex side of the lever. The tip of the blade 11 is bevelled toward the concave side of handle 10 to a sharp edge at 13 to facilitate insertion of the blade 11 into tight cracks or crevices. In addition, the blade is advantageously formed with a wedge shaped nail receiving slot 14 in the end and preferably formed with a generally wedge shaped nail receiving opening 15 intermediate its ends to facilitate pulling nails and the like. As will be noted from FIG. 2, the upper side of the blade is concavely shaped at 16 around the opening 15 to receive the head of the nail.

In accordance with the present invention, the transversely extending blade 12 at the other end of the handle is arranged to project from relatively opposite sides of the center line through the handle as is clearly shown in FIG. 2 and the end of the blade is connected to the handle by a neck portion 21 which overlies a portion of the blade and diverges relative thereto. As is apparent from FIGS. 4 and 5, the neck is also formed with a transversely arched cross-section that merges with the end of the transversely arched handle 10. The transverse blade is also formed with a sharpened tip 23 and, as best shown in FIGS. 2 and 3, the tip is preferably sharpened by bevelling the outer face of the blade so that the inner face does not tend to slip off the object W being loosened by the tool. A nail slot 22 is also preferably provided in the end of the blade 12.

An important feature of the pinch bar resides in the shape of outer face of the pinch bar and which enables the bar to be rocked on the supporting surface S in a direction longitudinally of the blade 12, as well as crosswise of the blade with a minimum of damage to the supporting surface. In some cases, it is desirable to swing the handle 10 of the tool in a plane that extends longitudinally of the blade 12, to thereby elevate the tip portion 23 of the blade as the latter rocks on the support surface S. In some instances, depending somewhat upon the object being loosened and on the clearance space available for moving the handle 10, it is desirable to rock the handle in a plane that extends crosswise of the blade 12 to tilt the tip portion of the blade as shown in FIG. 5. In accordance with the present invention, the blade 12 is made relatively wide and is formed with a shallow concavo-convex shape with the convex side at the outer face of the blade for engaging the supporting surface. In particular, the blade has a generally flat portion 24 which extends from the tip 23 rearwardly to a point substantially aligned with the handle 10. The blade progressively decreases in width in a direction away from the tip 23 and merges with transversely curved side portions 25 along a line such as 24a in FIG. 3. As best shown in FIGS. 1, 4 and 5, the transversely curved side portions 25 have a radius of curvature which is large as compared to the width of the blade to provide a shallow cross-sectional curve that merges smoothly with the portion 24. The generally flat portion of the blade also merges with a longitudinally and transversely curved portion 26 which projects to the other side of the center line through the handle 10 and joins the transversely arched neck portion 21. As will be noted from FIG. 2, the apex or crest 27 of the convexedly shaped outer face of the blade 12 is disposed in substantial alignment with the handle 10. Thus, the pinch bar can be rocked in a direction longitudinally of the blade 12 to elevate and lower the tip 23 and can also be rocked in a direction crosswise of the blade from the position shown in FIGURE 4 to a position such as shown in FIG. 5 to tilt the tip portion 23. The shallow convex configuration of the outer face of the blade facilitates the aforedescribed rocking movement and provides a smoothly curved bearing area for contact with the supporting surface S so as to minimize damage to the surface. In addition, the transversely curved configuration of the lever 10 and neck portion 21, as well as the dished configuration of the blade 12, rigidifies the pinch bar and enables fabrication of the bar from relatively light weight stock to provide a light weight and economical tool.

I claim:

A pinch bar made from a relatively thin strip of metal comprising, an elongated longitudinally straight handle of a length to form a relatively long lever for manipulation of the bar by the hand of a user, a relatively shorter neck at one end of the handle diverging relative to the centerline of the handle to one side of the latter, and a generally concavo-convex blade having one end joined integrally to the neck and extending therefrom crosswise of the centerline of the handle and having the major portion thereof projecting laterally from the other side of the handle, said neck and said handle having a transversely arched cross section defining a transversely convex face at said one side of the handle and a transversely concave face at the other side of the handle, said transversely arched neck merging smoothly with said handle and said blade, said handle and said neck and portions of the blade adjacent the neck having a substantially uniform thickness and a radius of curvature that is large as compared to the width of the strip, said blade having a flattened tip portion at the other end for engaging an object, the crosswise curve of said blade decreasing in a direction from said one end of the blade toward said other end to merge smoothly with said flattened tip portion and the width of said blade progressively increasing from said one end toward said other end, said blade being spaced axially from said one end of the handle and extending generally perpendicular thereto with the convex side of said blade facing away from the handle whereby the convex side of the blade provides an outer face that is convexly curved in a direction lengthwise of the blade and also crosswise thereof to enable rocking of the pinch bar on said outer face selectively in relatively transverse directions for loosening an object engaged by said tip portion.

References Cited in the file of this patent

UNITED STATES PATENTS

| | | |
|---|---|---|
| D. 59,371 | Nelson | Oct. 11, 1921 |
| 110,176 | Ward | Dec. 13, 1870 |
| 897,293 | Korpi | Sept. 1, 1908 |
| 1,486,820 | Wilder | Mar. 11, 1924 |
| 2,195,667 | Baker | Apr. 2, 1940 |